US006665567B2

(12) United States Patent
Iraschko

(10) Patent No.: US 6,665,567 B2
(45) Date of Patent: Dec. 16, 2003

(54) OPTICAL-RING INTEGER LINEAR PROGRAM FORMULATION

(76) Inventor: Rainer R. Iraschko, 705 San Conrado Terrace #3, Sunnyvale, CA (US) 94086

( * ) Notice: Subject to any disclaimer, the term of this patent is extended or adjusted under 35 U.S.C. 154(b) by 309 days.

(21) Appl. No.: 09/759,625

(22) Filed: Jan. 12, 2001

(65) Prior Publication Data

US 2001/0043771 A1 Nov. 22, 2001

Related U.S. Application Data

(60) Provisional application No. 60/176,232, filed on Jan. 14, 2000.

(51) Int. Cl.[7] .............................. G05B 13/02; G02B 6/28
(52) U.S. Cl. ....................... 700/36; 700/103; 359/341.2; 370/252; 370/403; 385/24; 398/25
(58) Field of Search ............................... 700/32, 33, 34, 700/36, 99, 103; 705/8, 412, 400; 385/24, 16; 370/400, 403, 408, 422, 424, 436, 404, 405, 252; 359/341.1, 341.2; 398/25

(56) References Cited

U.S. PATENT DOCUMENTS 6,304,347 B1 * 10/2001 Beine et al. ................. 359/110
6,339,663 B1 * 1/2002 Leng et al. ................... 385/24
6,421,349 B1 * 7/2002 Grover ........................ 370/408
6,438,286 B1 * 8/2002 Duerksen et al. ............. 385/24

OTHER PUBLICATIONS

Ramaswami et al., "Optical Networks: A Practical Perspective", p. 399–421, 1998.
Stern et al., "Multiwavelength Optical Networks, A Layered Approach", p. 543–707, 1999.
Wu, "Fiber Network Service Survivability", p. 255–329, 1992.

* cited by examiner

Primary Examiner—Paul P. Gordon
(74) Attorney, Agent, or Firm—Shailendra Bhumralkar; Daniel Tagliaferri; Michael Cammarata

(57) ABSTRACT

System for minimizing the cost of an optical network. A method is provided for designing an optical network to have minimized costs. The optical network has a plurality of nodes connected by interconnecting optical fibers. The method comprises inputting channel parameters associated with the optical network, inputting cost parameters associated with the optical network, calculating band parameters associated with the optical network, restricting at least one parameter associated with the optical network to having only integer values, and using an integer linear program to solve a minimization objective function that allows the cost of the optical network to be minimized, wherein the minimization objective function includes selected channel, cost and band parameters.

79 Claims, 9 Drawing Sheets

OPTICAL-RING INTEGER LINEAR PROGRAM FORMULATION

CROSS-REFERENCES TO RELATED APPLICATIONS

This application claims priority from co-pending U.S. Provisional Patent Application No. 60/176,232 filed Jan. 14, 2000, the disclosure of which is incorporated herein in its entirety for all purpose.

FIELD OF THE INVENTION

This invention relates generally to the field of optical networks, and more particularly, to a system for minimizing the cost of an optical network.

BACKGROUND OF THE INVENTION

An important consideration in the design of optical networks is the overall cost. The cost of an optical network includes, but is not limited to, the cost optimal placement of amplifiers, the cost optimal grouping of wavelengths into bands, and the cost optimal placement of regenerators.

One technique to minimize the cost of an optical network is referred to as a "brute force" technique, where all possible permutations of a network configuration are evaluated and the cheapest one is selected. While this technique may work for very small networks having few elements, it is not really practical or scalable for the types of large optical networks currently required.

Therefore, given the ever increasing size and capacity requirements of optical networks, it would be desirable to have an accurate, efficient and scalable way to minimize the overall cost of the designed network.

SUMMARY OF THE INVENTION

The present invention includes a method and apparatus to minimize the total cost (i.e., determining the cost optimal placement of amplifiers, the cost optimal grouping of wavelengths into bands, and the cost optimal placement of regenerators) of an optical network. One embodiment of the present invention provides an Integer Linear Program (ILP) formulation that uses a 'ring packing' technique to optimally route demands through one or more defined rings on the network.

The ILP formulation includes a flow-based constraints approach to determine the minimum cost, wherein eligible working and protection routes are identified, and thereafter, the most cost efficient routing is determined. Some of the benefits provided by the disclosed ILP formulation are:

the formulation minimizes the cost, rather than the capacity, of a network.
 the formulation is specific to an optical network, rather than a SONET or ATM network.
 the formulation optimally routes demands through one or more defined rings, instead of placing one or more rings on a set of predefined paths.
 the formulation is based on an ILP formulation, instead of using heuristics or simulated annealing techniques.

In one embodiment of the present invention a method is provided for designing an optical network to have minimized costs. The optical network has a plurality of nodes connected by interconnecting optical fibers. The method comprises inputting channel parameters associated with the optical network, inputting cost parameters associated with the optical network, calculating band parameters associated with the optical network, restricting at least one parameter associated with the optical network to having only integer values, and using an integer linear program to solve a minimization objective function that allows the cost of the optical network to be minimized, wherein the minimization objective function includes selected channel, cost and band parameters.

In another embodiment, a method for minimizing the cost of an optical network, the optical network having a plurality of nodes connected by interconnecting optical fibers, and wherein a plurality of parameters are associated with the nodes and the fibers. The method comprising steps of determining values for a first portion of the plurality of parameters, restricting values for a second portion of the plurality of parameters to have integer values, and solving a minimization objective function that includes at least some of the first and second portions of the plurality of parameters, to determine values for a third portion of the plurality of parameters, wherein a solution to the minimization objective function allows the cost of the optical network to be minimized.

The various features, advantages and other uses of the present invention will become more apparent by referring to the following detailed description and accompanying drawings.

DESCRIPTION OF THE SPECIFIC EMBODIMENTS

The method and apparatus included in the present invention can be used to minimizes the total cost of an optical network, for example, a Bi-Directional Switched Ring (BLSR) network. In one embodiment, an ILP formulation is provided that uses a 'ring packing' technique (i.e., it optimally routes demands through one or more defined rings). This is different from a 'ring placement' technique where the goal is to place one or more rings on a set of predefined working paths. It is assumed in the following description that wavelength conversion is possible at those nodes in the network where all the wavelengths within a band are added and/or dropped.

Figure 1:
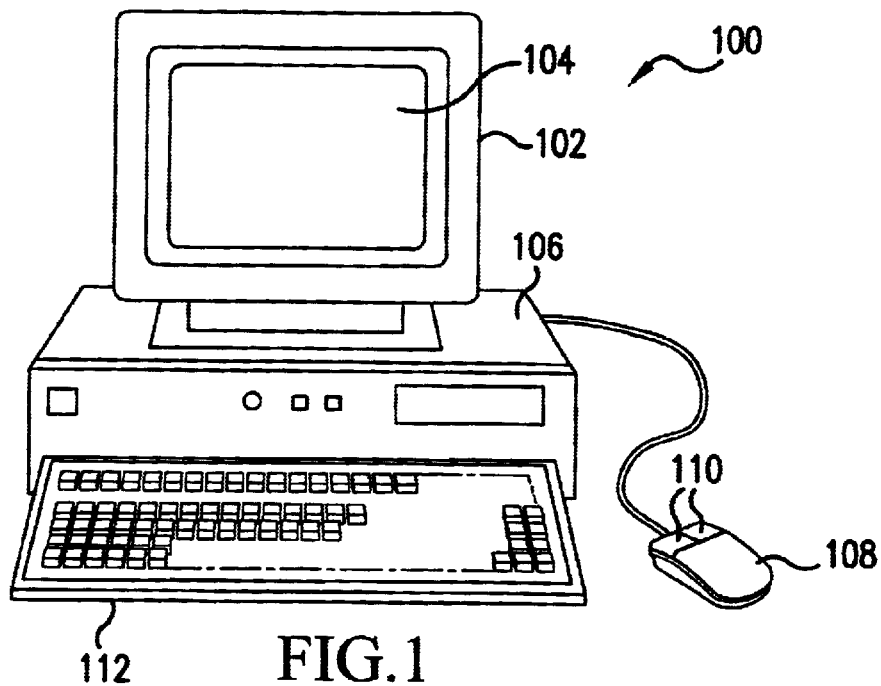
FIG. 1 shows a computer device suitable for use to implement one or more embodiments of the present invention.

FIG. 1 shows a computer device 100 suitable for use in one or more embodiments of the present invention. Computer device 100 includes display 102 having display screen 104. Cabinet 106 houses standard computer components (not shown) such as a disk drive, CDROM drive, display adapter, network card, random access memory (RAM), central processing unit (CPU), and other components, subsystems and devices. User input devices such as a mouse 108 having buttons 110, and a keyboard 112 are shown. Other user input devices such as a trackball, touch-screen, digitizing tablet, etc. can be used. In general, the computer device 100 is illustrative of one type of computer system, such as a desktop computer, suitable for use with the present invention. Computers can be configured with many different hardware components and can be made in many dimensions and styles (e.g., laptop, palmtop, server, workstation, mainframe). Thus, any hardware platform suitable for performing the processing described herein is suitable for use with the present invention.

Figure 2:
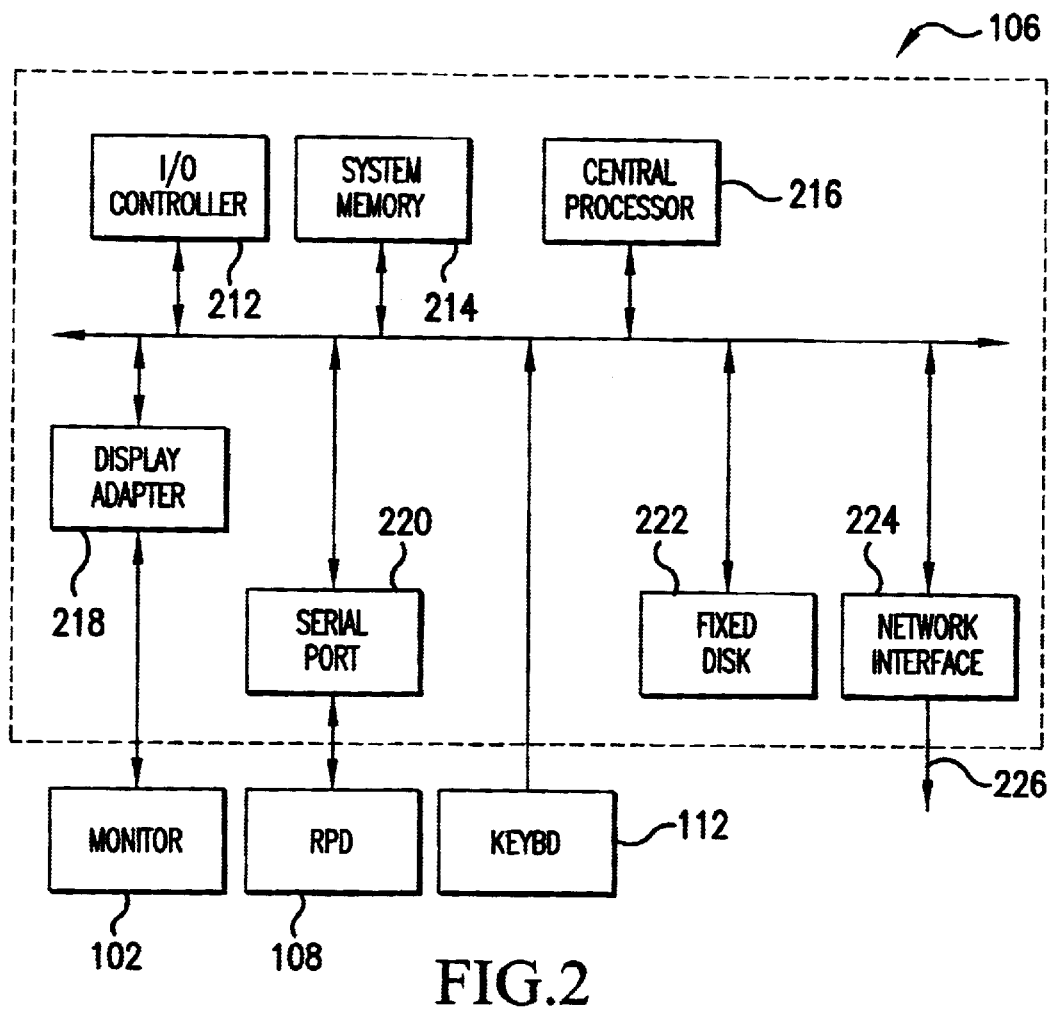
FIG. 2 shows internal components of the computer device of FIG. 1.

FIG. 2 illustrates subsystems that might typically be found in a computer device such as computer device 100, subsystems within box 106 are directly interfaced to an internal bus 210. Such subsystems typically are contained within the computer system, such as within the cabinet 106 of FIG. 1. The subsystems include an input/output (I/O) controller 212, System Random Access Memory (RAN) 214, Central Processing Unit (CPU) 216, Display Adapter 218, Serial Port 220, Fixed Disk 222 and Network Interface Adapter 224 with network I/O 226. The use of the bus 210 allows each of the subsystems to exchange data with other subsystems and, most importantly, with the CPU 216. External device can communicate with the CPU or other subsystems via the bus 210 or by interfacing with a subsystem connected to the bus. Monitor 102 connects to the bus through Display Adapter 218. A relative pointing device (RPD) such as a mouse 108 connects through Serial Port 220. Some devices such as keyboard 112 can communicate with the CPU 216 by direct means without using the main data bus as, for example, via an interrupt controller and associated registers (not shown).

As with the external physical configuration shown in FIG. 1, many subsystem configurations are possible. FIG. 2 is illustrative of one suitable configuration. Subsystems, components or devices other than those shown in FIG. 2 can be added. A suitable computer system can be achieved without using all of the subsystems shown in FIG. 2. Other subsystems such as a CDROM drive, graphics accelerator, etc. can be included in the configuration without affecting the performance of the system of the present invention.

Terminology

Figure 3:
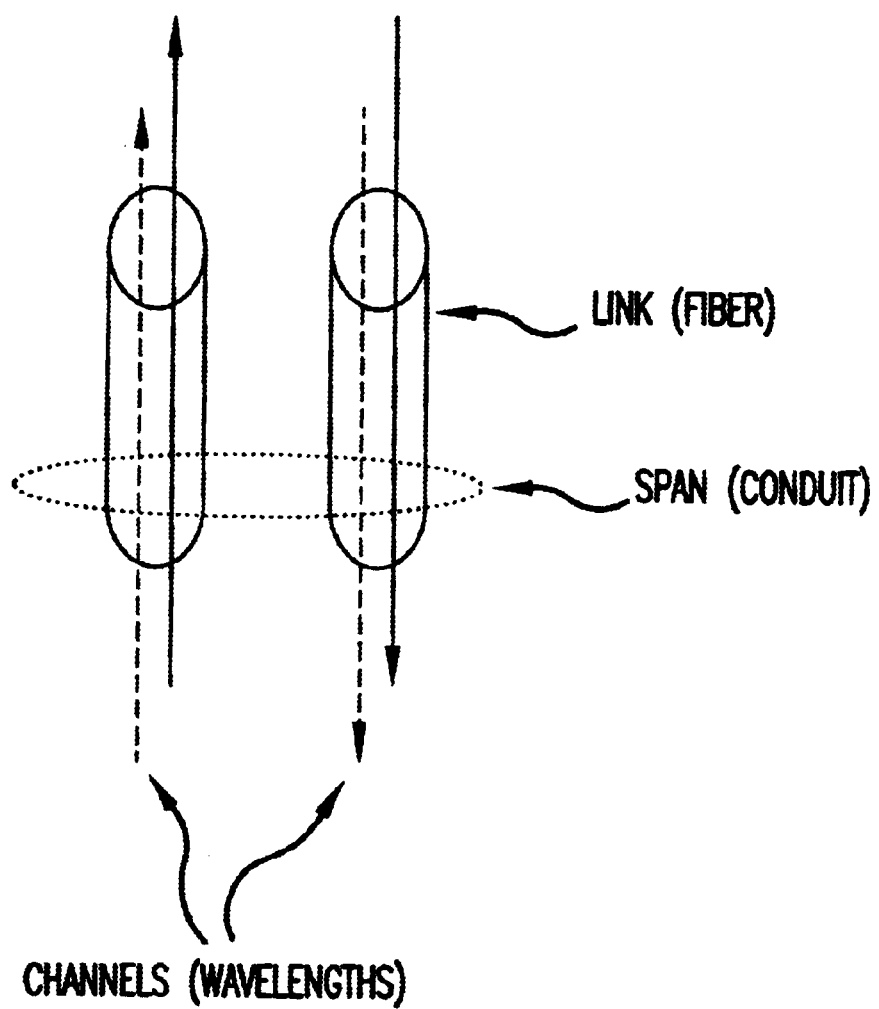
FIG. 3 shows two fibers to illustrate terminology used in an ILP formulation included in one embodiment of the present invention.
Figure 4:
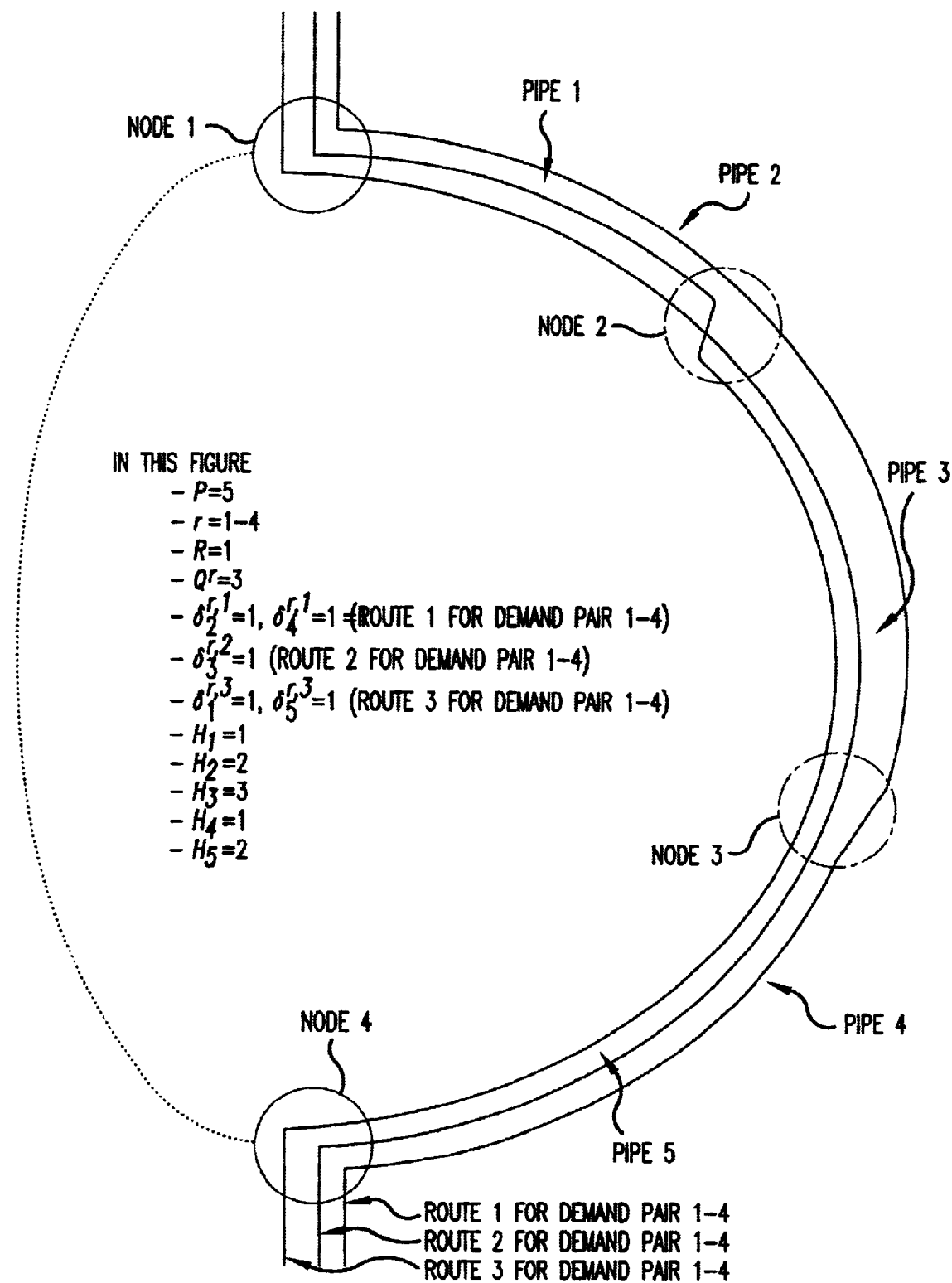
FIG. 4 shows a portion of an optical network that illustrates ILP notation in accordance with one embodiment of the present invention.
Figure 5:
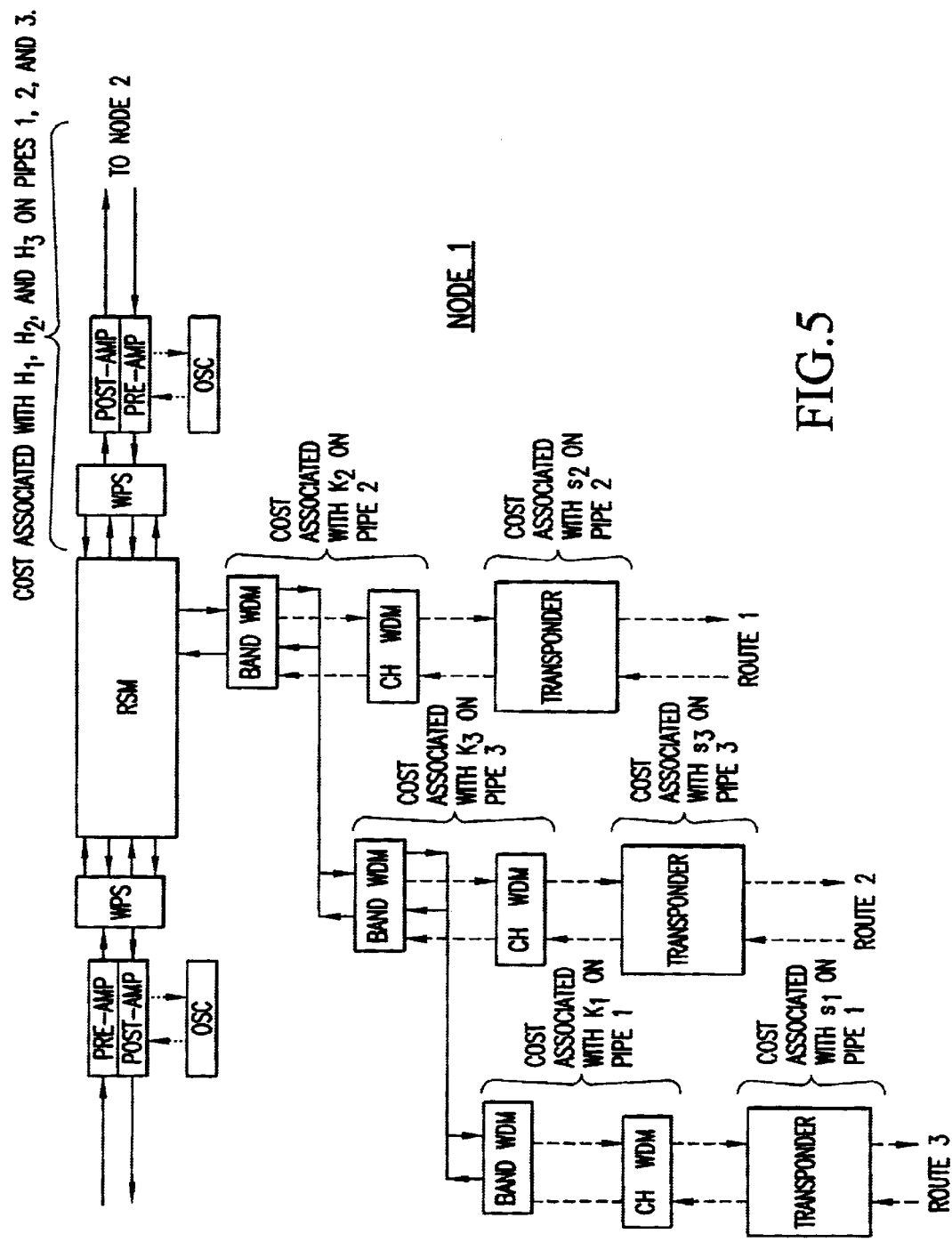
FIG. 5 shows a node architecture for node 1 in FIG. 4.
Figure 6:
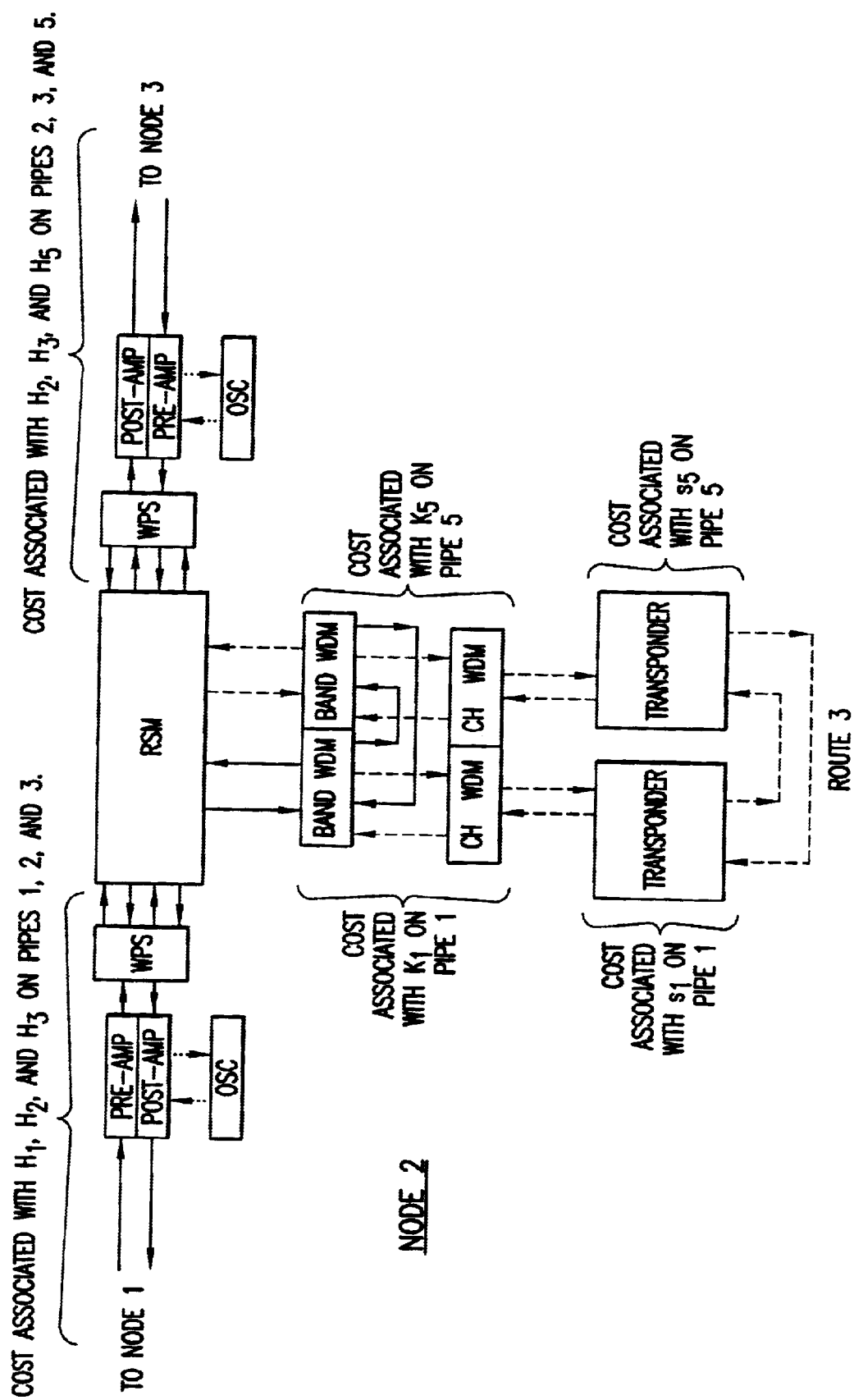
FIG. 6 shows a node architecture for node 2 in FIG. 4.
Figure 7:
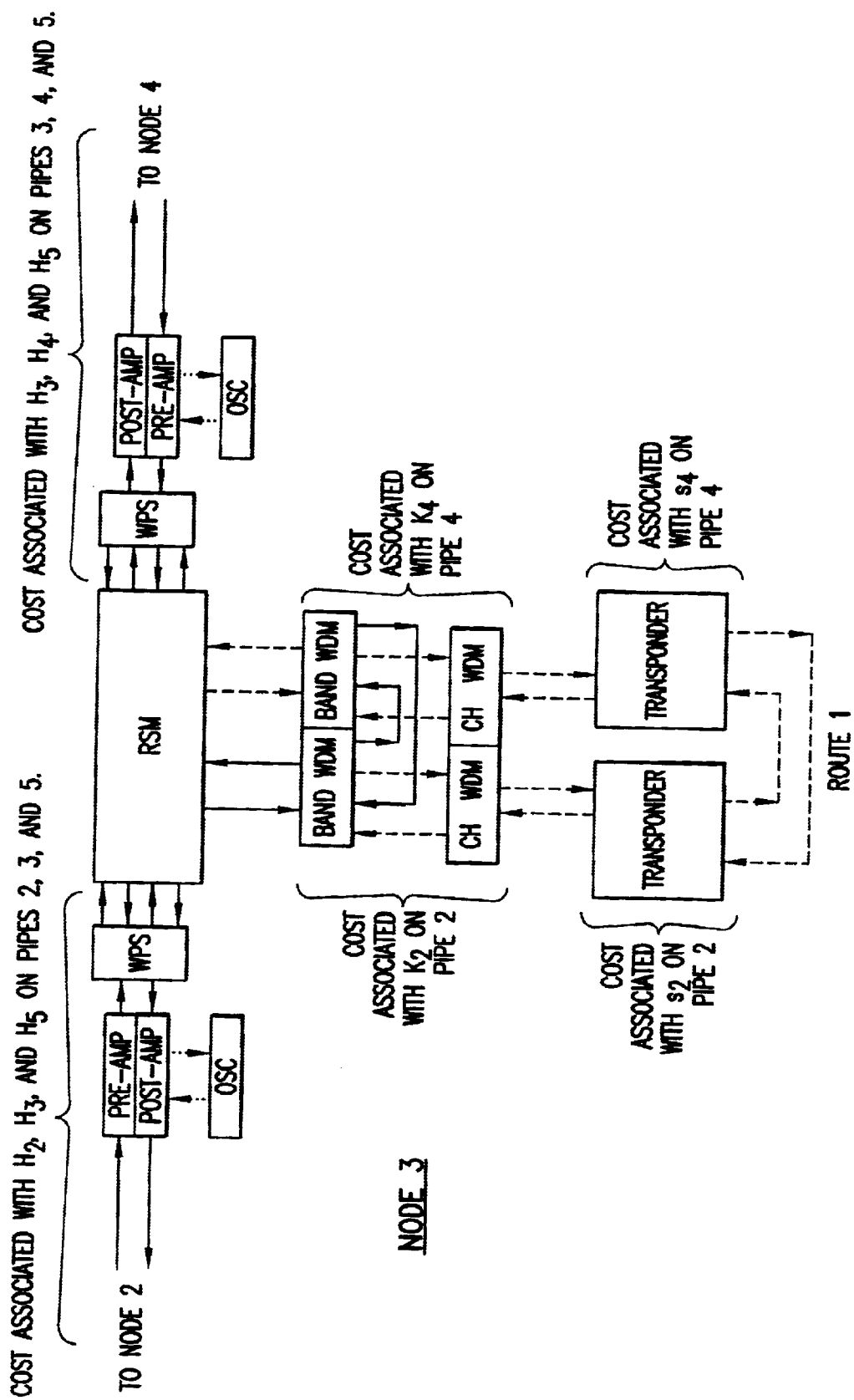
FIG. 7 shows a node architecture for node 3 in FIG. 4.
Figure 8:
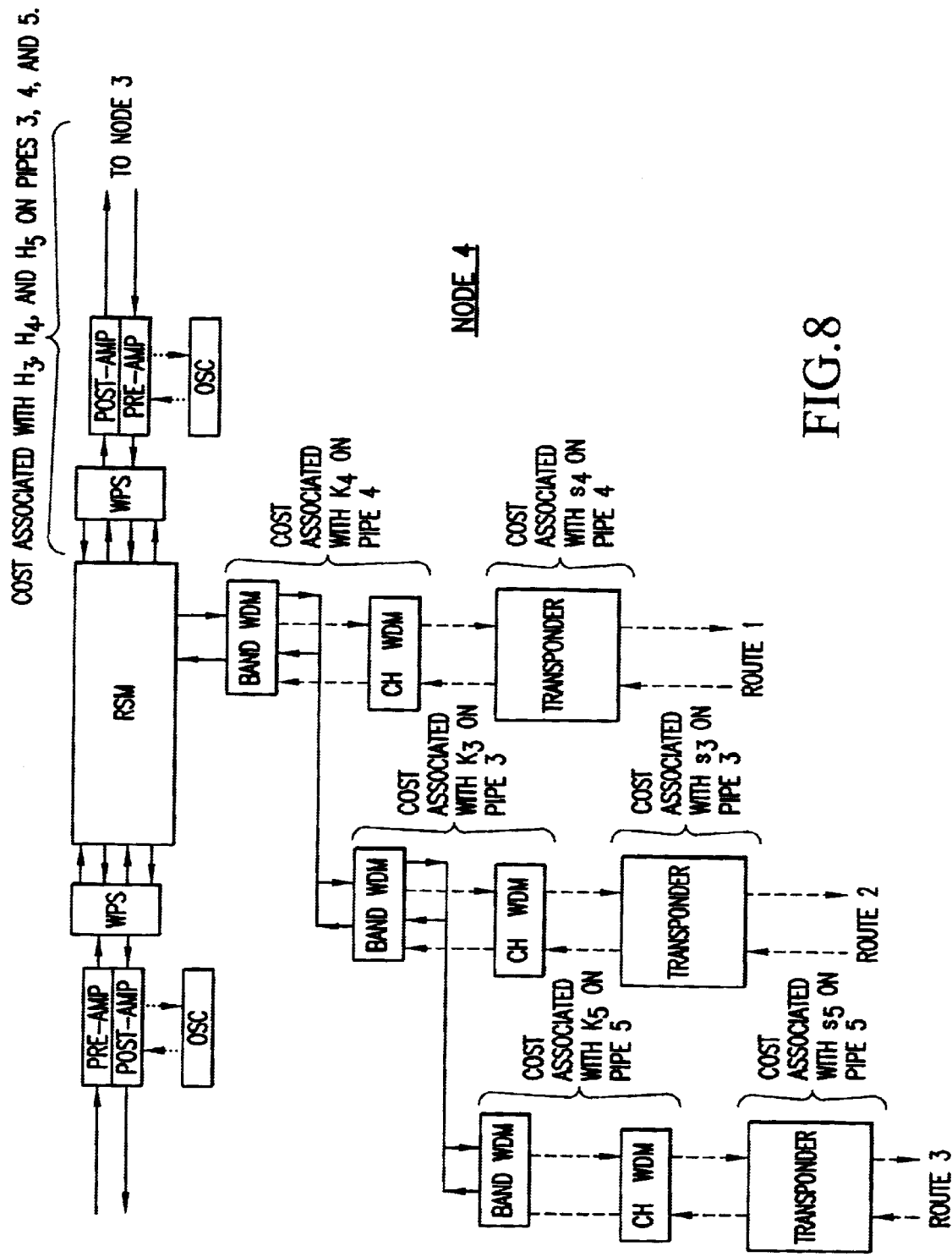
FIG. 8 shows a node architecture for node 4 in FIG. 4.

FIG. 3 shows two fibers of an optical network that can be used to illustrate basic terminology used in the ILP formulation provided by one embodiment of the present invention. FIG. 4 shows a portion of an optical network that includes four nodes (1–4) connected by optical fibers that illustrates additional ILP notation in accordance with one embodiment of the present invention. The terminology and ILP notation are as follows.

| | |
|---|---|
| Span | the set of links between a pair of nodes. (A span is generally equivalent to a conduit) |
| Link | the set of channels propagating in the same direction between a pair of nodes. (A link is generally equivalent to a fiber) |
| Channel | a single optical signal between a pair of nodes. A channel can have any frequency. Therefore, a concatenatio n of channels may form a Virtual Wavelength Path (VWP) or Wavelength Path (WP). |
| Band | a group of channels between a single pair of nodes. All channels in a band are added and dropped only at the band's terminating nodes. There is no access to a band at a tandem node. |
| Pipe | the set of bands between a single pair of nodes (i.e. all bands between a pair of nodes reside in the same pipe). |
| Route | a concatenation of pipes between the source and destination of a demand |
| Path | a concatenation of channels or wavelengths between the source and destination of a demand |

Variables

The ILP formulation included in one embodiment of the present invention uses a set of variables as input. The variables are defined as follows.

| | |
|---|---|
| R | The set of source-destination pairs in a ring. |
| $\delta_p^{r,q}$ | Is 1 if eligible working route 'q' for demand pair 'r' traverses working pipe 'p', and 0 otherwise. |
| $Q^r$ | The total number of eligible working routes for demand pair 'r'. |
| $D^r$ | The total demand in channels for demand pair 'r'. |
| $z_p$ | The size of all bands in working pipe 'p'. (Note that two bands between the same pair of nodes cannot have different sizes. For example, two bands in working pipe 'p' can have 4 channels each, but not 4 and 8 channels respectively.) |
| $s_p$ | The cost of adding a single channel to working pipe 'p'. |
| $K_p$ | The one time cost of adding a band of size $z_p$ to working pipe 'p'. |
| P | The number of eligible working pipes in the network, i.e. the number of node pairs between which a band could exist if required. |
| $H_p$ | The cost of pipe 'p' as determined by its length. (Note: $H_p$ is a relative cost measure that assigns the same cost to all pipes of the same length, and possibly a larger cost to pipes of longer length. Given that the absolute cost of a pipe is unimportant, $H_p$ may be set to a pipe's hop length if its exact cost is unknown. In all cases $H_p$ must use the same unit of measure. For example, if $H_p$ is set to a pipe's hop length in one case, $H_p$ is set to a pipe's hop length in all cases.) |

Additional variables evaluated by the ILP formulation are defined as follows.

| | |
|---|---|
| $\lambda^{r,q}$ | The amount of demand (i.e. the number of channels) from relation 'r' on working route 'q'. |
| $B_p$ | The number of bands in working pipe 'p'. |
| $c^{r,q}$ | The cost of adding a channel to working route 'q' for demand pair 'r'. (Note: these values may be entered as input to the integer program instead of specifying $s_p$ values. However, specifying $s_p$ values is easier than specifying $c^{r,q}$ values.) |
| $x_p$ | Is a binary variable that is equal to 1 if $B_p$ is greater than 0, and equal to 0 if $B_p$ is equal to 0. |

DETAILS OF ONE EMBODIMENT OF AN ILP FORMULATION

The objective of the ILP formulation included in one embodiment of the present invention is to minimize the total cost of an optical network, such as a BLSR network. A minimization objective function is expressed as:

Constraints

The IPL formulation included in one embodiment of the present invention utilizes several constraints that make it possible to solve the above minimization objective function to determine the minimum cost of an optical network.

Figure 10:
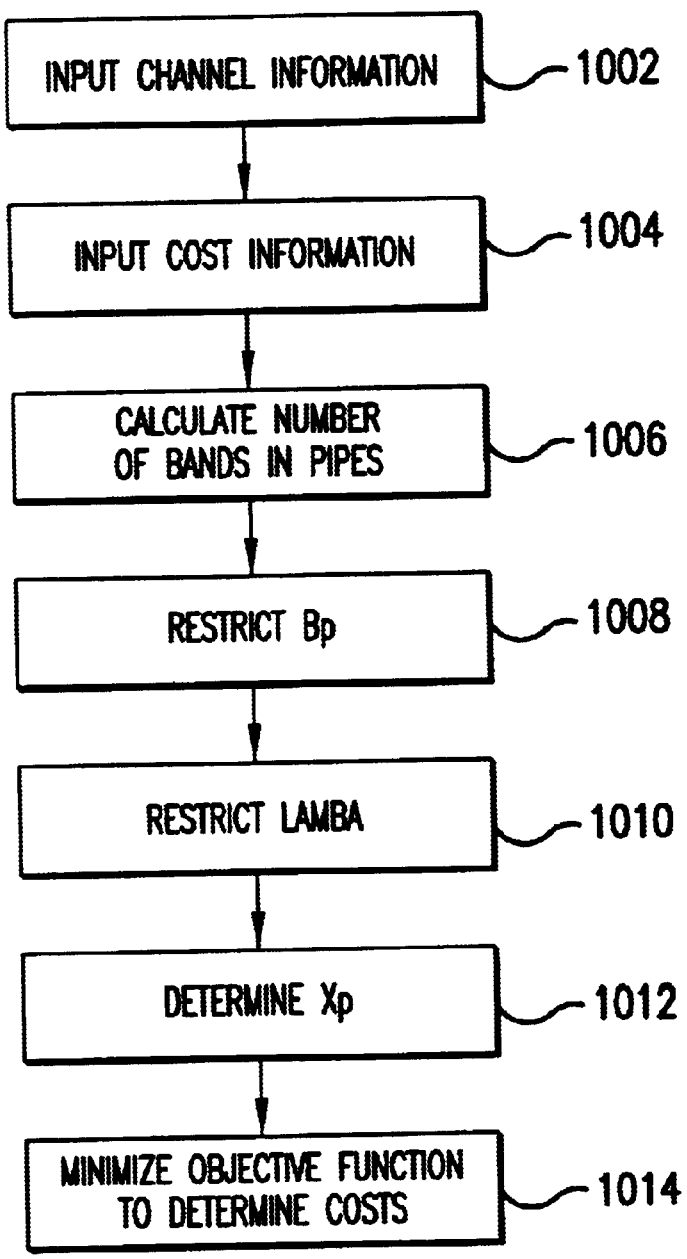
FIG. 10 shows a flow diagram for minimizing the cost of an optical network according to one embodiment of the present invention.

FIG. 10 provides a flow diagram that shows the process of using the constraints to solve the minimization objective function. The constraints are described as follows with reference to the flow diagram of FIG. 10.

1. At block 1002, channel information is input to the ILP formulation. The total number of channels on all eligible working routes for node pair 'r' is equal to the total demand between node pair 'r' ('r' defined below):

$$\sum_{q=1}^{Q^r} \lambda^{r,q} = D^r \; \forall \; r$$

2. At block 1004, cost information is input to the ILP formulation. The cost of adding a channel to working route 'q' for demand pair 'r' is the sum of the cost of adding a channel to every working pipe that route 'q' traverses. In another embodiment this constraint can be omitted because it does not contain any unknowns; however, it is assumed that specifying $s_p$ values is easier than specifying $c^{r,q}$ values, and specifying $s_p$ values requires entering this constraint in the integer program formulation.

$$c^{r,q} = \sum_{p=1}^{P} s_p \cdot \delta_p^{r,q} \; \forall \; r, q$$

3. At block 1006, the number of bands in a working pipe is calculated. The number of bands in working pipe 'p' is equal to the size of pipe 'p' divided by the size of any band in pipe 'p' (note: all bands in pipe 'p' must have the same size):

$$B_p \geq \left\lceil \frac{\sum_{r=1}^{R} \sum_{q=1}^{Q^r} \lambda^{r,q} \cdot \delta_p^{r,q}}{z_p} \right\rceil \; \forall \; p$$

4. At block 1008, the value of $B_p$ is restricted to be a positive integer.

$$B_p \geq 0, \; B_p \in \text{int} \forall p$$

5. At block 1010, the value of $\lambda^{r,q}$ is restricted to be a positive integer.

$$\lambda^{r,q} \geq 0, \; \lambda^{r,q} \in \text{int} \forall r, q$$

6. At block 1012, the value of $x_p$ is determined. The variable $x_p$ is a binary variable that is equal to 1 if $B_p$ is greater than 0, and equal to 0 if $B_p$ is equal to 0:

$$x_p \geq \frac{B_p}{M^*}, \; 0 \leq x_p \leq 1, \; x_p \in \text{int} \; \forall \; p$$

The variable M is an integer larger than max $\{B_p\}$. In one embodiment, M may be only slightly larger than $B_p$ so that the ILP formulation converges quickly on a solution. For example, if the value of $B_p$ will not be more than eleven, it is recommended that M be set to 12.

7. At block 1014, the values determined by the previous constraints are used to solve the minimization objective function to determine the minimum cost of the optical network. The minimization objective function may be solved by any suitable computer device, such as computer device 100. Additionally, the minimization objective function may be solved by an ILP engine that is designed to solve ILP formulations.

Example Minimization

FIGS. 5–8 show detailed views, respectively, of nodes 1–4 shown in FIG. 4. The detailed views of the nodes shown in FIGS. 5–8 include identification of costs associated with each node.

Referring again to FIG. 4, the portion of the optical network shown therein includes pipes defined between the nodes to illustrate operation of the ILP formulation included in one embodiment of the present invention. For the purpose of this example, nodes 1–4 are connected by pipes 1–5 as defined by the following.

nodes 1–2 are connected by pipe 1
nodes 1–3 are connected by pipe 2
nodes 1–4 are connected by pipe 3
nodes 3–4 are connected by pipe 4
nodes 2–4 are connected by pipe 5

Furthermore, in addition to the eligible routes between nodes 1 and 4 shown above, additional eligible routes exist between the nodes as follows.

nodes 1 and 2 on pipe 1
nodes 1 and 3 on pipe 2
nodes 3 and 4 on pipe 4
nodes 2 and 4 on pipe 5

For this example, a demand matrix is used to describe the channels requirements between the nodes. The demand matrix is as follows:

2 channels between nodes 1 and 2
3 channels between nodes 1 and 3
1 channel between nodes 2 and 4
1 channel between nodes 3 and 4
3 channels between nodes 1 and 4

Node relationships are used to clarify the example and are defined as follows:

node pair 1–2, will be labeled relationship (r)1
node pair 1–3, will be labeled relationship (r)2
node pair 2–4, will be labeled relationship (r)3
node pair 3–4, will be labeled relationship (r)4
node pair 1–4, will be labeled relationship (r)5

Given the above described conditions, the unknown variables in the ILP formulation are:

$\lambda^{1,1}, \lambda^{2,1}, \lambda^{3,1}, \lambda^{4,1}, \lambda^{5,1}, \lambda^{5,2}, \lambda^{5,3}$
$B_1, B_2, B_3, B_4, B_5$
$c^{1,1}, c^{2,1}, c^{3,1}, c^{4,1}, c^{5,1}, c^{5,2}, c^{5,3}$
$x_1, x_2, x_3, x_4, x_5$ Given the above described conditions, the known variables in the ILP formulation are:

$R = 5$ $\delta_1^{1,1} = 1, \; \delta_2^{1,1} = 0, \; \delta_3^{1,1} = 0, \; \delta_4^{1,1} = 0, \; \delta_5^{1,1} = 0$ $\delta_1^{2,1} = 0, \; \delta_2^{2,1} = 1, \; \delta_3^{2,1} = 0, \; \delta_4^{2,1} = 0, \; \delta_5^{2,1} = 0$ $\delta_1^{3,1} = 0, \; \delta_2^{3,1} = 0, \; \delta_3^{3,1} = 0, \; \delta_4^{3,1} = 0, \; \delta_5^{3,1} = 1$ $\delta_1^{4,1} = 0, \; \delta_2^{4,1} = 0, \; \delta_3^{4,1} = 0, \; \delta_4^{4,1} = 1, \; \delta_5^{4,1} = 0$ $\delta_1^{5,1} = 0, \; \delta_2^{5,1} = 1, \; \delta_3^{5,1} = 0, \; \delta_4^{5,1} = 1, \; \delta_5^{5,1} = 0$ $\delta_1^{5,2} = 0, \; \delta_2^{5,2} = 0, \; \delta_3^{5,2} = 1, \; \delta_4^{5,2} = 0, \; \delta_5^{5,2} = 0$ $\delta_1^{5,3} = 1, \; \delta_2^{5,3} = 0, \; \delta_3^{5,3} = 0, \; \delta_4^{5,3} = 0, \; \delta_5^{5,3} = 1$ $Q^1 = 1, \quad Q^2 = 1, \quad Q^3 = 1, \quad Q^4 = 1, \quad Q^5 = 3$ $D^1 = 2, \quad D^2 = 3, \quad D^3 = 1, \quad D^4 = 1, \quad D^5 = 3$ $z_1 = z_2 = z_3 = z_4 = z_5 = 4$ $s_1 = s_2 = s_3 = s_4 = s_5 = s$ $K_1 = K_2 = K_3 = K_4 = K_5 = K$ $P = 5$ $H_1 = 1$ $H_2 = 2$ $H_3 = 3$ $H_4 = 1$ $H_5 = 2$ Solving the ILP Formulation The first step in solving the ILP formulation is expanding constraint 2 to form the following expressions.

$$c^{1,1} = \sum_{p=1}^{5} s \cdot \delta_p^{1,1} = s$$

$$c^{2,1} = \sum_{p=1}^{5} s \cdot \delta_p^{2,1} = s$$

$$c^{3,1} = \sum_{p=1}^{5} s \cdot \delta_p^{3,1} = s$$

$$c^{4,1} = \sum_{p=1}^{5} s \cdot \delta_p^{4,1} = s$$

$$c^{5,1} = \sum_{p=1}^{5} s \cdot \delta_p^{5,1} = 2s$$

$$c^{5,2} = \sum_{p=1}^{5} s \cdot \delta_p^{5,2} = s$$

$$c^{5,3} = \sum_{p=1}^{5} s \cdot \delta_p^{5,3} = 2s$$

The second step in solving the ILP formulation is expanding constraint 1 to determine the following:

$$\text{for } r = 1, \sum_{q=1}^{1} \lambda^{1,q} = \lambda^{1,1} = 2$$

$$\text{for } r = 2, \sum_{q=1}^{1} \lambda^{2,q} = \lambda^{2,1} = 3$$

$$\text{for } r = 3, \sum_{q=1}^{1} \lambda^{3,q} = \lambda^{3,1} = 1$$

$$\text{for } r = 4, \sum_{q=1}^{1} \lambda^{4,q} = \lambda^{4,1} = 1$$

$$\text{for } r = 5, \sum_{q=1}^{1} \lambda^{5,q} = \lambda^{5,1} + \lambda^{5,2} + \lambda^{5,3} = 3$$

The third step in solving the ILP formulation is expanding constraint 3 to form the following:

$$\text{for } p = 1, B_1 \geq \frac{\sum_{r=1}^{5} \sum_{q=1}^{Q^r} \lambda^{r,q} \cdot \delta_1^{r,q}}{4} = \frac{\lambda^{1,1} + \lambda^{5,3}}{4}$$

$$\text{for } p = 2, B_2 \geq \frac{\sum_{r=1}^{5} \sum_{q=1}^{Q^r} \lambda^{r,q} \cdot \delta_2^{r,q}}{4} = \frac{\lambda^{2,1} + \lambda^{5,1}}{4}$$

$$\text{for } p = 3, B_{31} \geq \frac{\sum_{r=1}^{5} \sum_{q=1}^{Q^r} \lambda^{r,q} \cdot \delta_3^{r,q}}{4} = \frac{\lambda^{5,2}}{4}$$

$$\text{for } p = 4, B_4 \geq \frac{\sum_{r=1}^{5} \sum_{q=1}^{Q^r} \lambda^{r,q} \cdot \delta_4^{r,q}}{4} = \frac{\lambda^{4,1} + \lambda^{5,1}}{4}$$

$$\text{for } p = 5, B_5 \geq \frac{\sum_{r=1}^{5} \sum_{q=1}^{Q^r} \lambda^{r,q} \cdot \delta_5^{r,q}}{4} = \frac{\lambda^{3,1} + \lambda^{5,3}}{4}$$

The fourth step in solving the ILP formulation is expanding constraint 6 to form the following:

$$\text{for } p = 1, x_1 \geq \frac{B_1}{12}$$

$$\text{for } p = 2, x_2 \geq \frac{B_2}{12}$$

$$\text{for } p = 3, x_3 \geq \frac{B_3}{12}$$

$$\text{for } p = 4, x_4 \geq \frac{B_4}{12}$$

$$\text{for } p = 5, x_5 \geq \frac{B_5}{12}$$

Next, the minimization objective function defined above can be expanded and expressed as:

$$\min\left\{\left(\sum_{r=1}^{5}\sum_{q=1}^{Q^r} \lambda^{r,q} \cdot c^{r,q}\right) + \left(\sum_{p=1}^{5} B_p \cdot K\right) + \left(\sum_{p=1}^{5} H_p \cdot x_p\right)\right\} =$$

$$\min\left\{\left(\sum_{q=1}^{1} \lambda^{1,q} \cdot c^{1,q} + \sum_{q=1}^{1} \lambda^{2,q} \cdot c^{2,q} + \sum_{q=1}^{1} \lambda^{3,q} \cdot c^{3,q} + \sum_{q=1}^{1} \lambda^{4,q} \cdot c^{4,q} + \sum_{q=1}^{3} \lambda^{5,q} \cdot c^{5,q}\right) + \left(\sum_{p=1}^{5} B_p \cdot K\right) + \left(\sum_{p=1}^{5} H_p \cdot x_p\right)\right\} =$$

$$\min\left\{\lambda^{1,1} \cdot c^{1,1} + \lambda^{2,1} \cdot c^{2,1} + \lambda^{3,1} \cdot c^{3,1} + \lambda^{4,1} \cdot c^{4,1} + \lambda^{5,1} \cdot c^{5,1} + \lambda^{5,2} \cdot c^{5,2} + \lambda^{5,3} \cdot c^{5,3} + K \cdot \sum_{p=1}^{5} B_p + \sum_{p=1}^{5} H_p \cdot x_p\right\} =$$

$$\min\{2s + 3s + s + s + \lambda^{5,1} \cdot 2s + \lambda^{5,2} \cdot s + \lambda^{5,3} \cdot s + K(B_1 + B_2 + B_3 + B_4 + B_5) + x_1 + 2x_2 + 3x_3 + x_4 + 2x_5\} =$$

$$\min\{7s + (2s \cdot \lambda^{5,1}) + (s \cdot \lambda^{5,2}) + (s \cdot \lambda^{5,3}) + K(B_1 + B_2 + B_3 + B_4 + B_5) + x_1 + 2x_2 + 3x_3 + x_4 + 2x_5\}$$

For the purposes of this example assume K=3s, and s=1. The minimization objective function and constraints can then be re-written as:

$$\min\{7 + 2\lambda^{5,1} + \lambda^{5,2} + \lambda^{5,3} + 3(B_1 + B_2 + B_3 + B_4 + B_5) + x_1 + 2x_2 + 3x_3 + x_4 + 2x_5\}$$

and subject to the following conditions.
1. $\lambda^{5,1} + \lambda^{5,2} + \lambda^{5,3} - 3 = 0$
2. $\lambda^{5,3} \leq 4 \cdot B_1 - 2$
3. $\lambda^{5,1} \leq 4 \cdot B_2 - 3$
4. $\lambda^{5,2} \leq 4 \cdot B_3$
5. $\lambda^{5,1} \leq 4 \cdot B_4 - 1$ 6. $\lambda^{5,3} \leq 4 \cdot B_5 - 1$
7. $x_1 \geq B_1/12$
8. $x_2 \geq B_2/12$
9. $x_3 \geq B_3/12$
10. $x_4 \geq B_4/12$
11. $x_5 \geq B_5/12$ All of the unknowns in the objective function are positive integers. Therefore, the equations above require that $B_1$, $B_2$, $B_4$, and $B_5$ (but not $B_3$) are greater than zero. Furthermore, given the above objective function, we would like to make all the B's as small as possible. Therefore, the objective function is minimized if:

$B_1=1$, $B_2=1$, $B_3=0$, $B_4=1$, $B_5=1$

Given these choices for B, it can be determined that $\lambda^{5,2}=0$, and $x_1=1, x_2=1, x_3=0, x_4=1, x_5=1$. Inspecting equation 1: $\lambda^{5,1} + \lambda^{5,3} = 3$, the objective function, and equations 2, 3, 5, and 6 it is apparent that the objective function is minimized if $\lambda^{5,1}=1$, and $\lambda^{5,3}=2$.

The solutions to the variables defined in the ILP formulation are therefore:

$$B_1 = 1, \quad B_2 = 1, \quad B_3 = 0, \quad B_4 = 1, \quad B_5 = 1$$

$$\lambda^{5,1} = 1, \quad \lambda^{5,2} = 0, \quad \lambda^{5,3} = 2$$

$$\lambda^{1,1} = 2$$

$$\lambda^{2,1} = 3$$

$$\lambda^{3,1} = 1$$

$$\lambda^{4,1} = 1$$

$$x_1 = 1, \quad x_2 = 1, \quad x_3 = 0, \quad x_4 = 1, \quad x_5 = 1$$

The solutions above stipulate that pipe 3 is empty, which is intuitively correct because this results in maximizing the sharing of bands.

Physical Limitations

Physical limitations such as the maximum length of a channel or band, or the maximum hop count of a path, can be taken into account when specifying eligible routes using $\delta_p^{r,q}$.

Eligible routes may be specified by a network design tool and entered into to the ILP formulation. The ILP formulation will use this information, along with the costs and demand matrix specified, to determine the optical band and channel structure within the ring. The network design tool can then process this output to determine the number and type of Circuit Packs needed at each node in the ring.

Spare Ring Design

In another embodiment a spare ring for the optical network is designed. The spare ring is capable of restoring all individual span failures between the nodes terminating the failure (i.e. the ring is a BLSR). The design insures that all bands traversing a given span can be successfully re-routed around the long portion of the ring in case of a ring switch. This allows the location of transponders, amplifiers, etc. to be determined in the protection path such that the cost is minimized and all bands on all spans can be re-routed around the long portion of the ring.

Figure 9:
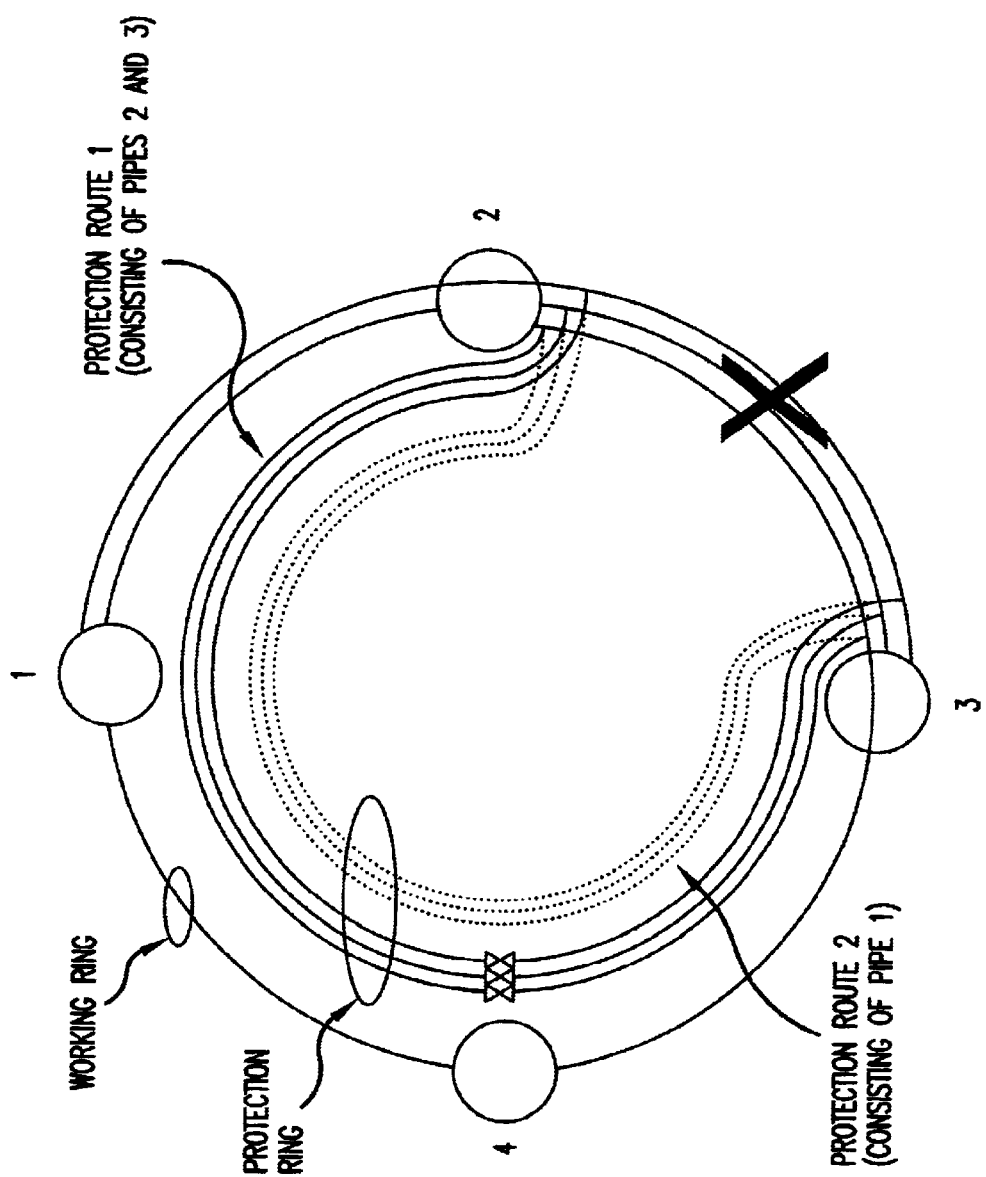
FIG. 9 shows a portion of an optical network that illustrates the complexity of the spare-ring design problem.

FIG. 9 shows a portion of an optical network and illustrates the complexity of the spare-ring design problem. As shown in FIG. 9, the working channels between nodes 2 and 3 can be restored using either protection route 1 or 2. Nonetheless it is possible to develop some general rules to facilitate the design of the spare ring. As a general rule of thumb, because the bands deployed in the protection ring will be used to restore all spans in the working ring, the size and number of bands on the largest span of the working ring determines the size and number of bands on each span of the protection ring. In addition, all of the protection bands may have to be demultiplexed at an intermediate node (hub) and regenerated (e.g. node 4 in FIG. 9). The location of this hub node is determined from an analysis of the distance each protection band can travel after a ring switch before requiring regeneration.

Incorporating Spare Ring Design in the ILP Formulation

In another embodiment, the ILP formulation presented above is modified to incorporate the design of the spare ring. By incorporating the spare ring design into the ILP formulation the need for a separate spare ring design process is obviated.

The following additional new variables are needed to modify the ILP formulation to included the spare ring. The new variables entered as input to the ILP formulation are:

| | |
|---|---|
| $\mu_p^{j,v}$ | is 1 if eligible protection route 'v' for the restoration of span 'j' traverses protection pipe 'p', and 0 otherwise. |
| $\tau_{p,j}$ | is 1 if eligible working pipe 'p' traverses span 'j', and 0 otherwise. |
| S | the number of spans in the ring. |
| $V^j$ | The total number of eligible protection routes for the restoration of span 'j'. |
| $t_p$ | The size of all bands in protection pipe 'p'. Note that two bands in the same pipe cannot have different sizes. For example, two bands in protection pipe 'p' can have 4 channels each, but not 4 and 8 channels respectively. In most cases $t_p$ is equal to $z_p$. |
| $h_p$ | The cost of adding a channel to protection pipe 'p'. ($h_p$ is analogous to $s_p$.) |
| $G_p$ | The one time cost of adding a band of size $h_p$ to protection pipe 'p'. ($G_p$ is analogous to $K_p$.) |
| I | The number of eligible protection pipes in the network. |
| $Y_p$ | The cost of pipe 'p' as determined by its length. (Note: $Y_p$ is a relative cost measure that assigns the same cost to all pipes of the same length, and possibly a larger cost to pipes of longer length. Given that the absolute cost of a pipe is unimportant, $Y_p$ may be set to a pipe's hop length if its exact cost is unknown. In all cases $Y_p$ must use the same unit of measure. For example, if $Y_p$ is set to a pipe's hop length in one case, $Y_p$ is set to a pipe's hop length in all cases. $Y_p$ is analogous to $H_p$.) |

The new variables evaluated by the ILP formulation are:

| | |
|---|---|
| $\phi^{j,v}$ | The number of working channels restored on protection route 'v' after the failure of span 'j'. |
| $u^{j,v}$ | cost of adding a channel to protection route 'v' for the restoration of span 'j'. (Note: these values may be entered as input to the integer program instead of specifying $h_p$ values. However, specifying $h_p$ values is easier than specifying $u^{j,v}$ values.) |
| $T_p$ | The number of bands in protection pipe 'p'. |
| $y_p$ | Is a binary variable that is equal to 1 if $T_p$ is greater than 0, and equal to 0 if $T_p$ is equal to 0. |

The new Objective function to minimize the cost of the optical network (including the spare ring) can be expressed as:

$$\min\left\{\left(\sum_{r=1}^{R}\sum_{q=1}^{Q^r}\lambda^{r,q}\cdot c^{r,q}\right) + \left(\sum_{j=1}^{S}\sum_{v=1}^{V^j}\phi^{j,v}\cdot u^{j,v}\right) + \left(\sum_{p=1}^{P}B_p\cdot K_p\right) + \left(\sum_{p=1}^{I}T_p\cdot G_p\right) + \left(\sum_{p=1}^{P}H_p\cdot x_p\right) + \left(\sum_{p=1}^{P}Y_p\cdot y_p\right)\right\}$$

New Constraints

The new constraints used to minimize the cost of an optical network (including spare ring) are defined as follows.

1. The total number of channels on all eligible working routes for node pair 'r' is equal to the total demand between node pair 'r':

$$\sum_{q=1}^{Q^r} \lambda^{r,q} = D^r \quad \forall r$$

2. The total number of channels on all eligible protection routes is equal to the total number of working channels lost when span 'j' fails:

$$\sum_{v=1}^{V,j} \phi^{j,v} = \sum_{r=1}^{R} \sum_{q=1}^{Q^r} \sum_{p=1}^{P} \lambda^{r,q} \cdot \delta_p^{r,q} \cdot \tau_{p,j} \quad \forall j$$

3. The cost of adding a channel to working route 'q' for demand pair 'r' is the sum of the cost of adding a channel to every working pipe that route 'q' traverses. (Note: this constraint can be omitted because it does not contain any unknowns; however, it is assumed that specifying $s_p$ values is easier than specifying $c^{r,q}$ values, and specifying $s_p$ values requires entering this constraint in the integer program.)

$$c^{r,q} = \sum_{p=1}^{P} s_p \cdot \delta_p^{r,q} \quad \forall r, q$$

4. The cost of adding a channel to protection route 'v' for the restoration of span 'j' is the sum of the cost of adding a channel to every protection pipe that route 'v' traverses. (Note: this constraint can be omitted because it does not contain any unknowns; however, it is assumed that specifying $h_p$ values is easier than specifying $u^{j,v}$ values, and specifying $h_p$ values requires entering this constraint in the integer program.)

5. The number of bands in working pipe 'p' is equal to the size of pipe 'p' divided by the size of any band in pipe 'p' (note: all bands in pipe 'p' must have the same size):

$$B_p \geq \left\lceil \frac{\left(\sum_{r=1}^{R} \sum_{q=1}^{Q^r} \lambda^{r,q} \cdot \delta_p^{r,q}\right)}{z_p} \right\rceil \quad \forall p$$

6. The number of bands in protection pipe 'p' is equal to the size of pipe 'p' divided by the size of any band in pipe 'p' (note: all bands in pipe 'p' must have the same size):

$$T_p \geq \left\lceil \frac{\left(\sum_{j=1}^{S} \sum_{v=1}^{V,j} \phi^{j,v} \cdot \mu_p^{j,v}\right)}{t_p} \right\rceil \quad \forall p$$

7. $B_p$ is a positive integer:

$$B_p \geq 0, \ B_p \in \text{int} \ \forall p$$

8. $T_p$ is a positive integer:

$$T_p \geq 0, \ T_p \in \text{int} \ \forall p$$

9. $\lambda^{r,q}$ is a positive integer:

$$\lambda^{r,q} \geq 0, \ \lambda^{r,q} \in \text{int} \ \forall r,q$$

10. $\phi^{j,v}$ is a positive integer:

$$\lambda^{j,v} \geq 0, \ \phi^{j,v} \in \text{int} \ \forall j,v$$

11. $x_p$ is a binary variable that is equal to 1 if $B_p$ is greater than 0, and equal to 0 if $B_p$ is equal to 0:

$$x_p \geq \frac{B_p}{M^*}, \quad 0 \leq x_p \leq 1, \quad x_p \in \text{int} \ \forall p$$

12. $y_p$ is a binary variable that is equal to 1 if $T_p$ is greater than 0, and equal to 0 if $T_p$ is equal to 0:

$$y_p \geq \frac{T_p}{M^*}, \quad 0 \leq y_p \leq 1, \quad y_p \in \text{int} \ \forall p$$

The variable M is an integer larger than max $\{T_p\}$. In one embodiment, M may be only slightly larger than $T_p$ so that the integer program converges quickly on a solution. For example, if $T_p$ will not be more than eleven, it is recommended that M be set to 12.

Setting Input Values

The larger the number of eligible routes specified using $\delta_p^{r,q}$ and $\mu_p^{j,v}$, the larger the solution space searched by the ILP formulation for the cheapest plausible solution, and the more likely the solution returned by the ILP formulation is globally optimal. However, the solution returned will only be the cheapest if the costs entered for $s_p$, $K_p$, $h_p$, $G_p$, $H_p$, and $Y_p$ are accurate. Specifying accurate values for $s_p$, $K_p$, $h_p$, $G_p$, $H_p$, and $Y_p$ is not an easy task, however, a few guidelines for setting these values are as follows, using as an example, terminology used in equipment of the assignee of the present invention.

In all cases $s_p$ may be set to the cost of two Wavelength Converter Interface (WCI) Circuit Packs (CP).

If a single band is added/dropped at a node, $K_p$ may be set to the combined cost of two Channel Wavelength Division Multiplexer (CWDM) CPs and two single-band Band Wavelength Division Multiplexer (BWDM) CPs. If the all-band BWDM is used, its cost should be equally split across all bands that use it. For example, if four bands are sharing a single all-band BWDM CP, the cost of adding and dropping a single band may be set to the combined cost of two CWDM CPs and ¼ of the cost of two all-band BWDM CPs.

In addition, if a working band must be regenerated at an intermediate node, the cost of the BWDM, CWDM, and WCI CPs needed at the working "hub" should be added to the costs described above.

Costs for $h_p$ and $G_p$ may be set in the same way that costs for $s_p$ and $K_p$ are set. However, costs for $h_p$ and $G_p$ are only incurred at those nodes where a protection band is regenerated, i.e. at a protection "hub".

Costs for $H_p$ and $Y_p$ include costs associated with the Pre-Amp, Post-Amp, Working Protect Splitter (WPS), Optical Supervisory Channel (OSC), and Ring Switch Module (RSM) CPs. The costs for these CPs should be split evenly across all working and protection bands which use them. Calculating these cost across the entire length of a pipe may be difficult. Therefore, as mentioned earlier, $H_p$ and $Y_p$ may be set to a pipe's hop length.

The invention is related to the use of the computer device 100 for minimizing the cost of an optical network. According to one embodiment of the invention, cost minimization of an optical network is provided by the computer device 100 in response to the central processor 216 executing one or more sequences of one or more instructions. For example, the instructions may cause the central processor 216 to execute the flow graph shown in FIG. 10. Such instructions may be read into the central processor 216 from another computer-readable medium, such as the fixed disk 222. Execution of the sequences of instructions causes the central processor 216 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the central processor 216 for execution. Such a medium may take many forms, including, but not limited to, non-volatile media, volatile media, and transmission media. Non-volatile media include, for example, optical or magnetic disks, such as those that may be used in conjunction with the fixed disk 222. Volatile media include dynamic memory, such as dynamic memory that may be associated with the system memory 214. Transmission media include coaxial cables, copper wire, and fiber optics, including the wires that comprise the network I/O 226. Transmission media can also take the form of radio or light waves, such as those generated during radio frequency (RF) and infra-red (IR) data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns or holes, a RAM, a PROM, an EPROM, a FLASH-EPROM, computer data storage structure, any other memory chip or cartridge, a carrier wave as describe hereinafter, or any other medium from which a computer can read.

Various forms of computer-readable media may be involved in carrying one or more sequences of one or more instructions to the central processor 216 for execution. For example, the instructions may initially be borne on a magnetic disk of a remote computer. The remote computer can load the instructions into its dynamic memory and send the instructions over a telephone line using a modem. A modem local to the computer system 100 (not shown) can receive the data on the telephone line and input it to the central processor 216 via the central bus 210. The instructions received by the central processor 216 may optionally be stored in an internal memory within the computer device 100 either before or after execution by the central processor 216.

The network interface 224 provides a two-way data communication coupling to the network I/O 226 that may be connected to a local network (not shown). For example, the network interface 224 may be an integrated services digital network (ISDN) card or a modem to provide a data communication connection to a corresponding type of telephone line. As another example, the network interface 224 may be a local area network (LAN) card to provide a data communication connection to a compatible LAN. Wireless links may also be implemented. In any such implementation, the network interface 224 sends and receives electrical, electromagnetic, or optical signals that carry digital data streams representing various types of information.

If the network I/O 226 is to be coupled to a data network, a connection may be established through a local network (not shown) to a host computer or to data equipment operated by an Internet Service Provider (ISP). The ISP in turn provides data communication services through the worldwide packet data communication network, now commonly referred to as the "Internet." The local network and the Internet both use electrical, electromagnetic or optical signals that carry digital data streams. The signal through the various networks and the signals on the network I/O 226 and through the network interface 224, which carry the digital data to and from the computer device 100, are exemplary forms of carrier waves transporting the information.

The computer device 100 can send messages and receive data, including program codes, through the networks(s), the network I/O 226 and the network interface 224. In the Internet example, an Internet server might transmit code for an application program through the Internet, ISP, local network, and network interface 224. In accordance with the invention, one such downloaded application provides for cost minimization of an optical network as described herein.

The received code may be executed by the central processor 216 as it is received, and/or stored in system memory 214, or other non-volatile storage for later execution. In this manner, the computer device 100 may obtain an application code in the form of a carrier wave.

The present invention includes a method and apparatus to minimize the cost of an optical network. In another embodiment, the cost of an optical network that includes a spare ring is minimized. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for minimizing the cost of an optical network, the optical network having a plurality of nodes connected by interconnecting optical fibers, and wherein a plurality of parameters are associated with the nodes and the fibers, the method comprising steps of:

determining values for a first portion of the plurality of parameters;

restricting values for a second portion of the plurality of parameters to have integer values; and solving a minimization objective function that includes at least some of the first and second portions of the plurality of parameters, to determine values for a third portion of the plurality of parameters, wherein a solution to the minimization objective function allows the cost of the optical network to be minimized.

2. The method of claim 1, wherein the step of determining comprises steps of:

inputting a value for at least a first parameter of the first portion of the plurality parameters; and calculating a value for at least a second parameter of the first portion of the plurality of parameters.

3. The method of claim 2, wherein the step of inputting a value for at least the first parameter comprises steps of:

inputting channel parameters associated with the optical network; and inputting cost parameters associated with the optical network.

4. The method of claim 2, wherein the step of calculating a value for at least the second parameter is a step of calculating band parameters associated with the optical network.

5. The method of claim 1, wherein the step of solving the minimization objective function includes a step of using an integer linear program to solve the minimization objective function.

6. A method for designing an optical network to have minimized costs, the optical network having a plurality of nodes connected by interconnecting optical fibers, the method comprising steps of:

inputting channel parameters associated with the optical network;

inputting cost parameters associated with the optical network;

calculating band parameters associated with the optical network;

restricting at least one parameter associated with the optical network to having only integer values; and using an integer linear program to solve a minimization objective function that allows the cost of the optical network to be minimized, wherein the minimization objective function includes selected channel, cost and band parameters.

7. An optical network that includes a plurality of nodes interconnected by optical fibers so that data traffic may flow between the nodes via the optical fibers, and wherein the optical network is optimized to have minimum costs by performing steps of:

inputting channel parameters associated with the optical network;

inputting cost parameters associated with the optical network;

calculating band parameters associated with the optical network;

restricting at least one parameter associated with the optical network to having only integer values; and using an integer linear program to solve a minimization objective function that allows the cost of the optical network to be minimized, wherein the minimization objective function includes selected channel, cost and band parameters.

8. Apparatus for designing an optical network to have minimized costs, the optical network having a plurality of nodes connected by interconnecting optical fibers, the apparatus comprising:

means for inputting channel parameters associated with the optical network;

means for inputting cost parameters associated with the optical network;

means for calculating band parameters associated with the optical network;

means for restricting at least one parameter associated with the optical network to have only integer values; and means for solving a minimization objective function to determine a minimum cost for the optical network.

9. Apparatus for minimizing the cost of an optical network, the optical network having a plurality of nodes connected by interconnecting optical fibers, the apparatus comprising:

an input device for allowing a user to input channel parameters and cost parameters associated with the optical network; and a processor coupled to the input device and operable to:

calculate band parameters associated with the optical network;

restrict at least one parameter associated with the optical network to have only integer values; and solve a minimization objective function to determine a minimum cost for the optical network, wherein the minimization objective function includes selected channel, cost and band parameters.

10. A computer-readable medium bearing program code minimizing the cost of an optical network, for dynamically configuring a device driver and including:

a first computer-readable program code segment for causing the computer to input channel parameters associated with the optical network;

a second computer-readable program code segment for causing the computer to input cost parameters associated with the optical network;

a third computer-readable program code segment for causing the computer to calculate band parameters associated with the optical network;

a fourth computer-readable program code segment for causing the computer to restrict at least one parameter associated with the optical network to have only integer values; and a fifth computer-readable program code segment for causing the computer to solve a minimization objective function to determine a minimum cost for the optical network, wherein the minimization objective function includes selected channel, cost and band parameters.

11. A computer-readable medium having stored thereon instructions which, when executed by a processor, cause the processor to minimize the cost of an optical network by performing steps of:

inputting channel parameters associated with the optical network;

inputting cost parameters associated with the optical network;

calculating band parameters associated with the optical network;

restricting at least one parameter associated with the optical network to have only integer values; and solving a minimization objective function to determine a minimum cost for the optical network.

12. A method for minimizing cost of an optical network having a plurality of nodes connected by interconnecting optical fibers, and wherein a plurality of parameters are associated with the nodes and the fibers, the method comprising:

determining values for a first set of parameters;

restricting at least one or more values of the first set of parameters to being a positive integer;

determining values for a second set of parameters using the determined values of the first set of parameters;

restricting at least one or more values of the second set of parameters to being a positive integer; and solving a minimization objective function using the first and second sets of parameters;

wherein a solution to the minimization objective function represents the minimized cost of the optical network.

13. The method according to claim 12 wherein the step of determining values for the first set of parameters includes:

obtaining values for channel parameters associated with the optical network;

obtaining values for cost parameters associated with the optical network; and calculating values for band parameters associated with the optical network using the channel parameters and the cost parameters.

14. The method according to claim 13 wherein one of the channel parameters includes an amount of demand; and wherein the amount of demand is restricted to being a positive integer.

15. The method according to claim 13 wherein one of the band parameters includes number of bands in a pipe; and
   wherein the number of bands in the pipe is restricted to being a positive integer.

16. The method according to claim 15 wherein the second set of parameters includes a binary variable; and
   wherein the binary variable assumes a first value if the number of bands is greater than zero and the binary variable assumes a second value if the number of bands is equal to zero.

17. The method according to claim 16 wherein the first value is one and the second value is zero.

18. The method according to claim 16 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;
   wherein value for parameter $c^{r,q}$ is derived from the cost parameters;
   wherein parameter $B_p$ represents number of bands in a pipe 'p';
   wherein parameter $K_p$ represents a one-time cost of adding a band to the pipe 'p';
   wherein parameter $H_p$ represents cost of the pipe 'p' as determined by its length; and
   wherein parameter $x_p$ is the binary variable associated with the pipe 'p'.

19. The method according to claim 16 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\right.$$

$$\left.\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the channel parameters;
   wherein values for parameters $c^{r,q}$ and $u^{j,v}$ are derived from the cost parameters;
   wherein parameter $B_p$ represents number of bands in a working pipe 'p';
   wherein parameter $T_p$ represents number of bands in a protection pipe 'p';
   wherein parameter $K_p$ represents a one-time cost of adding a band to the working pipe 'p';
   wherein parameter $G_p$ represents a one-time cost of adding a band to the protection pipe 'p';
   wherein parameter $H_p$ represents cost of the working pipe 'p' as determined by its length;
   wherein parameter $Y_p$ represents cost of the protection pipe 'p' as determined by its length;
   wherein parameter $x_p$ is the binary variable associated with the working pipe 'p'; and
   wherein parameter $Y_p$ is the binary variable associated with the protection pipe 'p'.

20. The method according to claim 19 wherein the optical network is configured as a spare ring.

21. The method according to claim 12 wherein the optical network is a bi-directional switched ring network.

22. A cost-minimized optical network designed using the method as recited in claim 12.

23. A method for minimizing cost of an optical network having a plurality of nodes connected by interconnecting optical fibers, and wherein a plurality of parameters are associated with the nodes and the fibers, the method comprising:
   determining values for a first set of parameters, wherein the first set of parameters includes channel parameters and cost parameters associated with the optical network;
   restricting at least one or more values of the first set of parameters to being a positive integer;
   determining values for a second set of parameters using the determined values of the first set of parameters, wherein the second set of parameters includes band parameters and a plurality of binary variables;
   restricting at least one or more values of the second set of parameters to being a positive integer; and
   solving a minimization objective function using the first and second sets of parameters;
   wherein a solution to the minimization objective function represents the minimized cost of the optical network.

24. The method according to claim 23 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;
   wherein value for parameter $c^{r,q}$ is derived from the cost parameters;
   wherein parameter $B_p$ represents number of bands in a pipe 'p';
   wherein parameter $K_p$ represents a one-time cost of adding a band to the pipe 'p';
   wherein parameter $H_p$ represents cost of the pipe 'p' as determined by its length; and
   wherein parameter $x_p$ is the binary variable associated with the pipe 'p'.

25. The method according to claim 24 further comprising:
   expanding the parameter $c^{r,q}$;
   expanding the parameter $\lambda^{r,q}$;
   expanding the parameter $B_p$;
   expanding the parameter $x_p$;
   substituting the expanded parameters $c^{r,q}$, $\lambda^{r,q}$, $B_p$ and $x_p$ into the minimization objective function; and
   minimizing the minimization objective function.

26. The method according to claim 23 wherein the optical network is a bi-directional switched ring network.

27. The method according to claim 23 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\right.$$
$$\left.\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the channel parameters;

wherein values for parameters $c^{r,q}$ and $u^{j,v}$ are derived from the cost parameters;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

28. The method according to claim 27 further comprising:
expanding the parameters $c^{r,q}$, $\lambda^{r,q}$, $B_p$, $x_p$, $\phi^{j,v}$, $u^{j,v}$, $T_p$ and $y_p$;
substituting the expanded parameters $c^{r,q}$, $\lambda^{r,q}$, $B_p$, $x_p$, $\phi^{j,v}$, $u^{j,v}$, $T_p$ and $y_p$ into the mimmization objective function; and
minimizing the minimization objective function.

29. A cost-minimized optical network designed using the method as recited in claim 23.

30. A method for minimizing cost of an optical network having a plurality of nodes connected by interconnecting optical fibers, and wherein a plurality of parameters are associated with the nodes and the fibers, the method comprising:
obtaining values for channel parameters associated with the optical network;
restricting at least one or more of the values of the channel parameters to being a positive integer;
obtaining values for cost parameters associated with the optical network;
calculating values for band parameters associated with the optical network using the channel parameters and the cost parameters;
restricting at least one or more of the values of the band parameters to being a positive integer;
calculating values for a plurality of binary variables using the calculated band parameters, wherein a binary variable assumes a first value if an associated band parameter is greater than zero and the binary variable assumes a second value if the associated band parameter is equal to zero; and
solving a minimization objective function using selected channel parameters, cost parameters, band parameters and binary variables.

31. The method according to claim 30 wherein the optical network is a bi-directional switched ring network.

32. The method according to claim 30 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;

wherein value for parameter $c^{r,q}$ is derived from the cost parameters;

wherein parameter $B_p$ represents number of bands in a pipe 'p';

wherein parameter $K_p$ represents a one-time cost of adding a band to the pipe 'p';

wherein parameter $H_p$ represents cost of the pipe 'p' as determined by its length; and wherein parameter $x_p$ is the binary variable associated with the pipe 'p'.

33. The method according to claim 30 wherein the channel parameters include a set of channel parameters relating to working routes and a set of channel parameters relating to protection routes;

wherein the cost parameters include a set of cost channel parameters relating to working routes and a set of cost parameters relating to protection routes;

wherein the band parameters include a set of band parameters relating to working pipes and a set of band parameters relating to protection pipes; and wherein the plurality of binary variables includes a set of binary variables relating to working pipes and a set of binary variables relating to protection pipes.

34. The method according to claim 33 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\right.$$
$$\left.\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the respective channel parameters relating to working and protection routes;

wherein values for parameters $c^{r,q}$ and $u^{j,v}$ are derived from the respective cost parameters relating to working and protection routes;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

35. The method according to claim 34 wherein the optical network is configured as a spare ring.

36. A cost-minimized optical network designed using the method as recited in claim 30.

37. A method for minimizing cost of an optical network having a plurality of nodes connected by interconnecting optical fibers, and wherein a plurality of parameters are associated with the nodes and the fibers, the method comprising:

obtaining values for a set of channel parameters including a subset of channel parameters relating to working routes and a subset of channel parameters relating to protection routes;

restricting at least one or more values of the subsets of channel parameters relating to working routes and protection routes to being a positive integer;

obtaining values for a set of cost parameters including a subset of cost parameters relating to working routes and a subset of cost parameters relating to protection routes;

calculating values for a set of band parameters relating to working pipes using the subsets of channel parameters and cost parameters relating to working routes;

calculating values for a set of band parameters relating to protection pipes using the subsets of channel parameters and cost parameters relating to protection routes;

restricting at least one or more of the values of the sets of band parameters relating to working and protection pipes to being a positive integer;

calculating values for a set of binary variables relating to working pipes using the calculated band parameters relating to working pipes;

calculating values for a set of binary variables relating to protection pipes using the calculated band parameters relating to protection pipes; and solving a minimization objective function using selected channel and cost parameters relating to working and protection routes and band parameters and binary variables relating to working and protection pipes.

38. The method according to claim 37 wherein a binary variable relating to a working pipe assumes a first value if an associated band parameter relating to the working pipe is greater than zero and the binary variable relating to the working pipe assumes a second value if the associated band parameter relating to the working pipe is equal to zero; and wherein a binary variable relating to a protection pipe assumes the first value if an associated band parameter relating to the protection pipe is greater than zero and the binary variable relating to the protection pipe assumes the second value if the associated band parameter relating to the protection pipe is equal to zero.

39. The method according to claim 38 wherein the first value is one and the second value is zero.

40. The method according to claim 37 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the respective channel parameters relating to working and protection routes;

wherein values for parameters $c^{r,q}$ and $u^{j,v}$ are derived from the respective cost parameters relating to working and protection routes;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

41. The method according to claim 37 wherein the optical network is configured as a spare ring.

42. A cost-minimized optical network designed using the method as recited in claim 37.

43. A system for minimizing cost of an optical network having a plurality of nodes connected by interconnecting optical fibers, and wherein a plurality of parameters are associated with the nodes and the fibers, the system comprising:

a first plurality of program instructions configured to determine values for a first set of parameters and restrict at least one or more values of the first set of parameters to being a positive integer;

a second plurality of program instructions configured to determine values for a second set of parameters using the determined values of the first set of parameters and restrict at least one or more values of the second set of parameters to being a positive integer; and a third plurality of program instructions configured to solve a minimization objective function using the first and second sets of parameters;

wherein a solution to the minimization objective function represents the minimized cost of the optical network.

44. The system according to claim 43 wherein the first plurality of program instructions is further configured to:

obtain values for channel parameters associated with the optical network;

obtain values for cost parameters associated with the optical network; and calculate values for band parameters associated with the optical network using the channel parameters and the cost parameters.

45. The system according to claim 44 wherein one of the channel parameters includes an amount of demand; and wherein the amount of demand is restricted to a positive integer.

46. The system according to claim 44 wherein the optical network is a bi-directional switched ring network.

47. The system according to claim 44 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\right.$$
$$\left.\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the channel parameters;

wherein values for parameters $c^{r,q}$ and $u^{j,v}$ are derived from the cost parameters;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

48. The system according to claim 44 wherein one of the band parameters includes number of bands in a pipe; and wherein the number of bands in the pipe is restricted to a positive integer.

49. The system according to claim 48 wherein the second set of parameters includes a binary variable; and wherein the binary variable assumes a first value if the number of bands is greater than zero and the binary variable assumes a second value if the number of bands is equal to zero.

50. The system according to claim 49 wherein the first value is one and the second value is zero.

51. The system according to claim 49 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;

wherein value for parameter $c^{r,q}$ is derived from the cost parameters;

wherein parameter $B_p$ represents the number of bands in the pipe 'p';

wherein parameter $K_p$ represents a one-time cost of adding a band to the pipe 'p';

wherein parameter $H_p$ represents cost of the pipe 'p' as determined by its length; and wherein parameter $x_p$ is the binary variable associated with the pipe 'p'.

52. A system for minimizing cost of an optical network having a plurality of nodes connected by interconnecting optical fibers, and wherein a plurality of parameters are associated with the nodes and the fibers, the system comprising:

a first plurality of program instructions configured to determine values for a first set of parameters and restrict at least one or more values of the first set of parameters to being a positive integer, wherein the first set of parameters includes channel parameters and cost parameters associated with the optical network;

a second plurality of program instructions configured to determine values for a second set of parameters using the determined values of the first set of parameters and restrict at least one or more values of the second set of parameters to being a positive integer, wherein the second set of parameters includes band parameters and a plurality of binary variables; and a third plurality of program instructions configured to solve a minimization objective function using the first and second sets of parameters;

wherein a solution to the minimization objective function represents the minimized cost of the optical network.

53. The system according to claim 52 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;

wherein value for parameter $c^{r,q}$ is derived from the cost parameters;

wherein parameter $B_p$ represents number of bands in a pipe 'p';

wherein parameter $K_p$ represents a one-time cost of adding a band to the pipe 'p';

wherein parameter $H_p$ represents cost of the pipe 'p' as determined by its length; and wherein parameter $x_p$ is the binary variable associated with the pipe 'p'.

54. The system according to claim 52 wherein the third plurality of program instructions is further configured to:

expand parameters $c^{r,q}$, $\lambda^{r,q}$, $B_p$ and $x_p$; and substitute the expanded parameters $c^{r,q}$, $\lambda^{r,q}$, $B_p$ and $x_p$ into the minimization objective function; and minimize the minimization objective function.

55. The system according to claim 52 wherein the optical network is a bi-directional switched ring network.

56. The system according to claim 52 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\right.$$
$$\left.\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the channel parameters;

wherein values for parameters $c^{r,q}$ and $u^{j,v}$ are derived from the cost parameters;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

57. The system according to claim 56 wherein the third plurality of program instructions is further configured to:

expand the parameters $c^{r,q}$, $\lambda^{r,q}$, $B_p$, $x_p$, $\phi^{j,v}$, $u^{j,v}$, $T_p$ and $y_p$;

substitute the expanded parameters $c^{r,q}$, $\lambda^{r,q}$, $B_p$, $x_p$, $\phi^{j,v}$, $u^{j,v}$, $T_p$ and $y_p$ into the minimization objective function; and minimize the minimization objective function.

58. The system according to claim 56 wherein the optical network is configured as a spare ring.

59. A system for minimizing cost of an optical network having a plurality of nodes connected by interconnecting optical fibers, and wherein a plurality of parameters are associated with the nodes and the fibers, the system comprising:

a first plurality of program instructions configured to obtain values for channel parameters and cost parameters associated with the optical network and restrict at least one or more of the values of the channel parameters to being a positive integer; and a second plurality of program instructions configured to:
calculate values for band parameters associated with the optical network using the channel parameters and the cost parameters and restrict the values of the band parameters to being positive integers;

calculate values for a plurality of binary variables using the calculated band parameters, wherein a binary variable assumes a first value if an associated band parameter is greater than zero and the binary variable assumes a second value if the associated band parameter is equal to zero; and solve a minimization objective function using selected channel parameters, cost parameters, band parameters and binary variables.

60. The system according to claim 59 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;

wherein value for parameter $c^{r,q}$ is derived from the cost parameters;

wherein parameter $B_p$ represents number of bands in a pipe 'p';

wherein parameter $K_p$ represents a one-time cost of adding a band to the pipe 'p';

wherein parameter $H_p$ represents cost of the pipe 'p' as determined by its length; and wherein parameter $x_p$ is the binary variable associated with the pipe 'p'.

61. The system according to claim 60 wherein the optical network is a bi-directional switched ring network.

62. The system according to claim 59 wherein the channel parameters include a set of channel parameters relating to working routes and a set of channel parameters relating to protection routes;

wherein the cost parameters include a set of cost channel parameters relating to working routes and a set of cost parameters relating to protection routes;

wherein the band parameters include a set of band parameters relating to working pipes and a set of band parameters relating to protection pipes; and wherein the plurality of binary variables includes a set of binary variables relating to working pipes and a set of binary variables relating to protection pipes.

63. The system according to claim 62 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the respective channel parameters relating to working and protection routes;

wherein values for parameters $c^{r,q}$ and $u^{j,v}$ are derived from the respective cost parameters relating to working and protection routes;

wherein parameter $B_p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

64. The system according to claim 63 wherein the optical network is configured as a spare ring.

65. A system for minimizing cost of an optical network having a plurality of nodes connected by interconnecting optical fibers, and wherein a plurality of parameters are associated with the nodes and the fibers, the system comprising:

a first plurality of program instructions configured to:
obtain values for a set of channel parameters including a subset of channel parameters relating to working routes and a subset of channel parameters relating to protection routes;

restrict at least one or more values of the subsets of channel parameters relating to working routes and protection routes to being a positive integer; and obtain values for a set of cost parameters including a subset of cost parameters relating to working routes and a subset of cost parameters relating to protection routes; and a second plurality of program instructions configured to:
- calculate values for a set of band parameters relating to working pipes using the subsets of channel parameters and cost parameters relating to working routes;
- calculate values for a set of band parameters relating to protection pipes using the subsets of channel parameters and cost parameters relating to protection routes;
- restrict at least one or more of the values of the sets of band parameters relating to working and protection pipes to being a positive integer;
- calculate values for a set of binary variables relating to working pipes using the calculated band parameters relating to working pipes;
- calculate values for a set of binary variables relating to protection pipes using the calculated band parameters relating to protection pipes; and
- solve a minimization objective function using selected channel and cost parameters relating to working and protection routes and band parameters and binary variables relating to working and protection pipes.

66. The system according to claim 65 wherein a binary variable relating to a working pipe assumes a first value if an associated band parameter relating to the working pipe is greater than zero and the binary variable relating to the working pipe assumes a second value if the associated band parameter relating to the working pipe is equal to zero; and
wherein a binary variable relating to a protection pipe assumes the first value if an associated band parameter relating to the protection pipe is greater than zero and the binary variable relating to the protection pipe assumes the second value if the associated band parameter relating to the protection pipe is equal to zero.

67. The system according to claim 66 wherein the first value is one and the second value is zero.

68. The system according to claim 65 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the respective channel parameters relating to working and protection routes;
- wherein values for parameters $c^{r,q}$ and $u^{j,v}$ are derived from the respective cost parameters relating to working and protection routes;
- wherein parameter $B_p$ represents number of bands in a working pipe 'p';
- wherein parameter $T_p$ represents number of bands in a protection pipe 'p';
- wherein parameter $K_p$ represents a one-time cost of adding a band to the working pipe 'p';
- wherein parameter $G_p$ represents a one-time cost of adding a band to the protection pipe 'p';
- wherein parameter $H_p$ represents cost of the working pipe 'p' as determined by its length;
- wherein parameter $Y_p$ represents cost of the protection pipe 'p' as determined by its length;
- wherein parameter $x_p$ is the binary variable associated with the working pipe 'p'; and
- wherein parameter $y_p$ is the binary variable associated with the protection pipe 'p'.

69. The system according to claim 65 wherein the optical network is configured as a spare ring.

70. An optical network designed using a cost-minimizing method, wherein the optical network includes a plurality of nodes connected by interconnecting optical fibers and wherein a plurality of parameters are associated with the nodes and the fibers, the method comprising:
- determining values for a first set of parameters;
- restricting at least one or more values of the first set of parameters to being a positive integer;
- determining values for a second set of parameters using the determined values of the first set of parameters;
- restricting at least one or more values of the second set of parameters to being a positive integer; and
- solving a minimization objective function using the first and second sets of parameters;
- wherein a solution to the minimization objective function represents the minimized cost of the optical network.

71. The method according to claim 70 wherein the step of determining values for the first set of parameters includes:
- obtaining values for channel parameters associated with the optical network;
- obtaining values for cost parameters associated with the optical network; and
- calculating values for band parameters associated with the optical network using the channel parameters and the cost parameters.

72. The method according to claim 71 wherein one of the channel parameters includes an amount of demand; and
wherein the amount of demand is restricted to being a positive integer.

73. The method according to claim 71 wherein one of the band parameters includes number of bands in a pipe; and
wherein the number of bands in the pipe is restricted to being a positive integer.

74. The method according to claim 73 wherein the second set of parameters includes a binary variable; and
wherein the binary variable assumes a first value if the number of bands is greater than zero and the binary variable assumes a second value if the number of bands is equal to zero.

75. The method according to claim 74 wherein the first value is one and the second value is zero.

76. The method according to claim 74 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{p=1}^{P}B_p\cdot K_p\right)+\left(\sum_{p=1}^{P}H_p\cdot x_p\right)\right\}$$

wherein value for parameter $\lambda^{r,q}$ is derived from the channel parameters;
- wherein value for parameter $c^{r,q}$ is derived from the cost parameters;
- wherein parameter $B_p$ represents number of bands in a pipe 'p';
- wherein parameter $K_p$ represents a one-time cost of adding a band to the pipe 'p';
- wherein parameter $H_p$ represents cost of the pipe 'p' as determined by its length; and
- wherein parameter $x_p$ is the binary variable associated with the pipe 'p'.

77. The method according to claim 74 wherein the minimization objective function is as follows:

$$\min\left\{\left(\sum_{r=1}^{R}\sum_{q=1}^{Q^r}\lambda^{r,q}\cdot c^{r,q}\right)+\left(\sum_{j=1}^{S}\sum_{v=1}^{V^j}\phi^{j,v}\cdot u^{j,v}\right)+\left(\sum_{p=1}^{P}B_p\cdot K_p\right)+\left(\sum_{p=1}^{I}T_p\cdot G_p\right)+\left(\sum_{p=1}^{P}H_p\cdot x_p\right)+\left(\sum_{p=1}^{P}Y_p\cdot y_p\right)\right\}$$

wherein values for parameters $\lambda^{r,q}$ and $\phi^{j,v}$ are derived from the channel parameters;

wherein values for parameters $c^{r,q}$ and $u^{j,v}$ are derived from the cost parameters;

wherein parameter $B^p$ represents number of bands in a working pipe 'p';

wherein parameter $T_p$ represents number of bands in a protection pipe 'p';

wherein parameter $K_p$ represents a one-time cost of adding a band to the working pipe 'p';

wherein parameter $G_p$ represents a one-time cost of adding a band to the protection pipe 'p';

wherein parameter $H_p$ represents cost of the working pipe 'p' as determined by its length;

wherein parameter $Y_p$ represents cost of the protection pipe 'p' as determined by its length;

wherein parameter $x_p$ is the binary variable associated with the working pipe 'p'; and wherein parameter $y_p$ is the binary variable associated with the protection pipe 'p'.

78. The method according to claim 77 wherein the optical network is configured as a spare ring.

79. The method according to claim 70 wherein the optical network is a bi-directional switched ring network.

* * * * *